Aug. 25, 1964

HISAO MAEDA 3,146,418

VARIABLE INDUCTOR

Filed May 11, 1960

INVENTOR:
HISAO MAEDA
by
Mestern & Rollin
ATTORNEYS

United States Patent Office 3,146,418
Patented Aug. 25, 1964

3,146,418
VARIABLE INDUCTOR
Hisao Maeda, 13 Shiba-koen, Minato-ku,
Tokyo-to, Japan
Filed May 11, 1960, Ser. No. 28,319
2 Claims. (Cl. 336—134)

This invention relates to variable inductors, and more particularly it relates to a new and improved variable inductor of a ganged operation.

It is an object of this invention to provide an interlocked, variable inductor of simple, compact, yet strong construction, which is suitable for mass-production and for miniaturization.

It is another object of this invention to provide a variable inductor as stated above, which is free from the disadvantage of howling, and which does not incur the disadvantages of irregularity due to differences in material.

The said objects, other objects and features of this invention have been achieved by the ganged variable inductor which comprises, essentially, two plates formed from a high-frequency magnetic substance or a material whose principal constituent is said substance (hereinafter referred to simply as a magnetic substance), said plates being so assembled that either of said plates can be rotated in mutual contact with the other. One of the said plates is carved out in the perpendicular direction referred to the plane of rotation around the periphery of two or more protruding cores for winding coils thereabout so as to leave said cores, the tops of said cores being in the same plane, and the said cores being situated at points removed from the shaft of rotation. The said plate is so constructed that, by placing a magnetic substance on said cores, a closed magnetic circuit is formed. In preferred embodiments of the invention, the said protruding cores are disposed diametrically opposite each other in the case of two protruding cores for winding coils and are so disposed that the lines joining their centers form an equilateral triangle in the case of three protruding cores.

The surface of the other, or second, plate which contacts the first plate is provided with inclined surfaces in the circumferential or rotational direction, each inclined surface having a shape of a sector in plan view with the line joining a protruding core and the shaft of rotation as the radius and with a suitable width so that the gap between the protruding cores about which are wound the coils of the first plate and the surface of the second plate can be varied by relative rotary movement of the two plates. The portions of the second plate which are not inclined are made to contact intimately with the surface of the first plate. By the above construction, it is possible to provide a ganged variable inductor wherein, by the relative rotation of the said plates, the inductances of the coils wound about the protruding cores can be varied at respectively suitable rates.

According to the present invention, since, in the case of the stationary plate and in the case of the rotating plate, each portion corresponding to each coil is composed of the same plate, the respective inductances of the ganged variable coils, that is, the relations between the inductances of the respective coils and the inductances of other respective coils, are affected to only an extremely small degree by differences in the magnetic properties of the magnetic substances. That is, in the case of mass-production, the magnetic properties differ somewhat between the individual finished products because of differences in the calcining temperatures or materials of the magnetic substances. For this reason it is difficult to obtain uniformity.

The magnetic substance to be used for this invention would be unsuitable for mass-production, as is apparent from the foregoing reason, if its magnetic properties were to differ depending on the position on the plate stock to be used. Fortunately, the differences in properties due to position on one plate is, in general, extremely small, but the difference between different plates might be larger. It will be appreciated, therefore, that the present invention has considerable practical value.

Moreover, since the inductor of this invention is made from only two pieces of the magnetic substance, it is suitable for miniaturization. The contact surfaces of the two pieces of magnetic substance of this invention are preferably well ground and lapped as closely as possible to optically flat surfaces, whereby a greater range of inductance variation is obtainable, and the change, due to abrasive wear, of the inductance is kept low.

If the contact surfaces of both plates are lapped to optically flat planes, the two surfaces will be made to possess the property of adhering uniformly by molecular attraction, whereby a smoothly operating variable inductor can be obtained. For this purpose, the construction is preferably adapted to press the two plates firmly together, by such mechanical means as a spring, to a distance whereat the molecular attractive force will take effect. Furthermore, by providing an oil film of uniform thickness between the contact surfaces of the two plates, abrasive wear thereof can be substantially reduced, and the resistance to rotation decreased.

The details of the invention and the manner in which the afore-stated objects as well as other objects, features, and advantages may best be achieved will be understood more fully from a consideration of the following detailed description of one embodiment of the invention, taken in conjunction with the accompanying drawing, in which.

Figure 1:
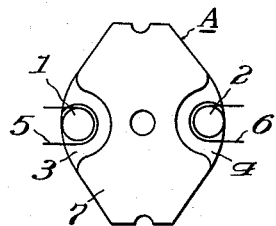
FIG. 1 is a plan view of a plate, made from a magnetic substance, on which is wound a coil, and which is used in the embodiment of this invention.

Referring to the drawings, the member A having protruding cores 1 and 2, about which are wound coils 5 and 6, respectively, is the stationary plate. The other member B shown is a rotating plate which is of the most practical construction for a double-interlocked, variable inductor.

Figure 2:
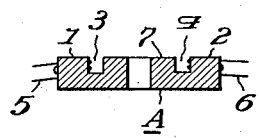
FIG. 2 is an elevational view, in section and projectionally corresponding to FIG. 1.

Referring to FIGS. 1 and 2, the stationary plate A is an integrally constructed member made from a magnetic substance, having carved out portions 3 and 4 surrounding protruding the cores 1 and 2, about which are wound coils 5 and 6, and having a central portion 7 which, in the assembled state, is in contact with the rotating plate B. The surface of said central portion 7 is lap-finished as nearly as possible to an optically flat plane.

Figure 3:
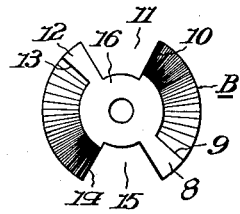
FIG. 3 is a plan view of the other plate, made from a magnetic substance, of the embodiment of this invention.
Figure 4:
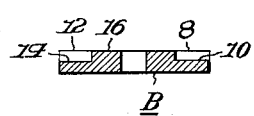
FIG. 4 is an elevational view, in section and projectionally corresponding to FIG. 3.

Referring to FIGS. 3 and 4, the rotating plate B is also integrally constructed from a magnetic substance. From its central portion 16, a portion 8, which has no taper whatsoever, in thickness, and which is of the same thickness as the central portion 16, radiates and forms or radial boundary of a sector. The thickness of said sector decreases gradually, beginning at line portion 9, in a rotational direction until the thickness is a minimum at a line portion 10, which is the other radial boundary of the said sector. Another sector, which is disposed opposite the above sector, is similarly formed and bears the numerical designations 12, 13, and 14, which correspond, respectively, to 8, 9, and 10 of the first sector. The said two sectors are mutually separated on their two radial sides by cut-out sector portions 11 and 15. If the two sectors are made identical in dimension and configuration, the inductor becomes a double-interlocked, variable inductor whose inductances vary at the same rate. The surface of the central portion 16 is lap-finished as nearly as possible to an optically flat plane.

Figure 5:
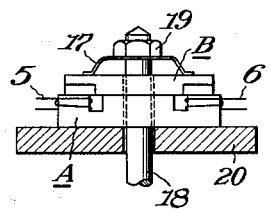
FIG. 5 is an elevational view, partly in section, showing the assembled and installed state of the embodiment of this invention.

In general, in order to obtain a smooth variation of inductance, and in order to provide adaptability to mass-production, the rotating plate is provided with a constant slope from line portion 9 to line portion 10 and, similarly, from line portion 13 to line portion 14. In the assembled state of the inductor as shown in FIG. 5, the surface of the central portion 7 of the stationary plate A and the surface of the central portion 16 of the rotating plate B are made to contact intimately, and a compressive force is imparted continuously by a spring 17 so that the two said plates will be drawn tightly together by the force of molecular attraction. The rotating plate B is provided with a rotary shaft 18 having a screw nut 19 screwed thereon, said nut being used for pressing said spring 17.

The functioning of the inductor of the above embodiment will be apparent from the following description. If, as a supposition, the rotating plate B is rotatably positioned so that the cut out portion 11 is confronting the protruding core 1, the inductance will be a minimum, the reason being that the gap between the two plates will then be a maximum. Then, as the rotating plate is turned progressively in the clockwise direction (as viewed from the top of the assembled state of FIG. 5), the portion 10 approaches the said protruding core. Consequently, the effective magnetic permeability of the magnetic circuit of the coil 5 wound about the said protruding core increases, and the inductance of the coil 5 progressively increases. Then, as the rotating plate is turned further in the clockwise direction, the gap between the two plates becomes progressively small because of the tapered thickness of the rotating plate, and the inductance increases substantially until the line portion 9 reaches the said protruding core 1, at which position, the gap becomes zero. Then, when the portion 8, which has zero gap, fully covers the planar area of the protruding core 1, the inductance becomes the maximum. The operation of the other portions 12, 13, 14, and 15 with respect to the other protruding core 2 is similar. In the above described manner, the functioning of a two-gang variable inductor is obtained. Moreover, since the protruding cores 1 and 2 are made of the same material, and the two inclined sectors of the rotating plate are also made of the same material, the proportion between the inductances of the two coils is not affected by any difference in material, and a two-gang variable inductor of constant variation can be obtained. It should be mentioned that the bottom surface of the stationary plate is, of course, made to remain adhering to the mounting plate 20 of FIG. 5.

In the present invention, by suitably adapting the construction of the inclined surfaces for varying the gap, on the plate which does not have the protruding cores, the rates of variation of the inductances of the coils can be suitably set. For example, in the case of a two-gang variable inductor, the said rates of variation of the two coils can be made equal, or a tracking variable inductor can be produced. Other combinations of rates are also possible, and this possibility applies also in the case of three or more ganged inductors.

In the present invention, of the two plates of magnetic substance, either can be made stationary and either can be made to rotate. Furthermore, both can be made to rotate in mutually opposite directions. In other terms, the functioning of the inductor is accomplished as long as the two plates rotate relative to each other.

Since it is obvious that many changes and modifications can be made in the above described details without departing from the nature and spirit of the invention, it is to be understood that the invention is not to be limited to the details described herein except as set forth in the appended claims.

I claim:

1. A ganged variable conductor suited for miniaturization and mass-producible, which comprises, in combination, a shaft; a lower plate concentrically fastened to said shaft; an upper plate disposed concentrically about said shaft and rotatable relative to, and in intimate contact with, said lower plate; both said plates being made of a magnetic material and having contact surfaces which are lap-finished to an optically flat plane; mechanical elastic force means imparted from the exterior of said plates to the extent that said contact surfaces of said plates are placed at a distance at which said plates are mutually drawn together by molecular attraction; said lower plate having at least two carved-out portions in perpendicular direction to the plane of rotation thus providing protruding cores separated from said shaft and lying in the same plane therewith; a coil wound about each of said cores, a closed magnetic circuit being formed when said upper plate contacts said cores; said upper plate having one inclined surface contacting said lower plate per each said core; said inclined surfaces being of sector shape in plan view, starting from the thinnest portion of said upper plate which is the portion having the maximum gap with respect to its corresponding protruding core, said sector being cut out to form a region wherein the effective gap value approaches infinity; said inclined surfaces having a radius substantially extending from the axis of rotation to the center of the corresponding core in circumferential direction so that the gap formed between said upper plate and said protruding cores of said lower plate is varied by the rotation of said upper plate relative to said lower plate, said variation being able to exceed 120 degrees, the portions of said upper plate without inclination making close contact with said lower plate; the inductance of said coils being varied by the rotation of said upper plate about said lower plate.

2. A ganged variable inductor, according to claim 1, wherein a uniform, thin film of oil is formed on the contact surfaces of the said two plates of the construction described in claim 1.

References Cited in the file of this patent

UNITED STATES PATENTS

| 2,107,172 | Agricola | Feb. 1, 1938 |
| 2,628,342 | Taylor | Feb. 10, 1953 |
| 2,882,633 | Jamieson | Apr. 21, 1953 |
| 3,024,409 | Brown | Mar. 6, 1962 |

FOREIGN PATENTS

| 233,027 | Switzerland | June 30, 1944 |
| 1,085,135 | France | July 12, 1954 |
| 1,175,256 | France | Nov. 10, 1958 |

OTHER REFERENCES

Frey: German application Serial No. S30,817, printed December 20, 1956 (Kl. 21a4 68).